United States Patent
Sato

(10) Patent No.: US 7,523,240 B2
(45) Date of Patent: Apr. 21, 2009

(54) INTERRUPT CONTROLLER AND INTERRUPT CONTROL METHOD

(75) Inventor: Junichi Sato, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 136 days.

(21) Appl. No.: 11/635,503

(22) Filed: Dec. 8, 2006

(65) Prior Publication Data

US 2007/0143516 A1 Jun. 21, 2007

(30) Foreign Application Priority Data

Dec. 19, 2005 (JP) ............................. 2005-364698

(51) Int. Cl.
*G06F 13/00* (2006.01)
(52) U.S. Cl. ...................... 710/265; 710/263; 710/264
(58) Field of Classification Search ................ 710/263, 710/264, 265
See application file for complete search history.

(56) References Cited

U.S. PATENT DOCUMENTS

| | | | | |
|---|---|---|---|---|
| 3,984,820 A | * | 10/1976 | Stanley et al. ............... | 710/265 |
| 5,083,261 A | * | 1/1992 | Wilkie ......................... | 710/265 |
| 5,471,620 A | * | 11/1995 | Shimizu et al. .............. | 710/265 |
| 6,002,877 A | * | 12/1999 | Yamagata .................... | 710/265 |
| 7,120,718 B2 | * | 10/2006 | Pezzini ........................ | 710/265 |
| 7,206,884 B2 | * | 4/2007 | Kimelman et al. .......... | 710/265 |
| 2001/0027502 A1 | * | 10/2001 | Bronson et al. ............. | 710/112 |

FOREIGN PATENT DOCUMENTS

JP 11-149382 6/1999

* cited by examiner

*Primary Examiner*—Glenn A Auve
(74) *Attorney, Agent, or Firm*—McGinn IP Law Group, PLLC

(57) ABSTRACT

An interrupt controller superior in maintenance performance and expandability. An interrupt controller 10 comprises a queue circuit 11 that holds channel numbers corresponding to interrupt inputs in the order of priority levels, and a queue control circuit 12 that changes the order of the channels held in the queue circuit 11 according to a new order of the priority levels when a priority level that corresponds to any channel number is changed. The order of the channel numbers in the queue circuit 11 is changed at a time of setting the priority levels unrelated to interrupt inputs. In order to select an interrupt to be notified to a CPU 20, an interrupt factor selection circuit 15 checks whether or not each channel number held in the queue circuit 11 has an interrupt input in turn from the head of the queue.

20 Claims, 13 Drawing Sheets

FIG. 2

| ENTRY NUMBER | CHANNEL PRIORITY LEVEL | CHANNEL NUMBER |
|---|---|---|
| 1 | 0 | INT11 |
| 2 | 3 | INT0 |
| 3 | 4 | INT22 |
| ... | ... | ... |
| 36 | 64 | INT5 |
| ... | ... | ... |
| 127 | 248 | INT16 |
| 128 | 255 | INT7 |

| ENTRY NUMBER | CHANNEL PRIORITY LEVEL | CHANNEL NUMBER |
|---|---|---|
| 1 | 0 | INT11 |
| 2 | 3 | INT0 |
| 3 | 4 | INT22 |
| ... | ... | ... |
| 36 | 62 | INT9 |
| 37 | 64 | INT5 |
| 38 | 65 | INT41 |
| ... | ... | ... |
| 127 | 248 | INT16 |
| 128 | 255 | INT7 |

| ENTRY NUMBER | CHANNEL PRIORITY LEVEL | CHANNEL NUMBER |
|---|---|---|
| 1 | 0 | INT11 |
| 2 | 2 | INT5 |
| 3 | 3 | INT0 |
| ... | ... | ... |
| 36 | 61 | INT33 |
| 37 | 62 | INT9 |
| 38 | 65 | INT41 |
| ... | ... | ... |
| 127 | 248 | INT16 |
| 128 | 255 | INT7 |

| ENTRY NUMBER | CHANNEL PRIORITY LEVEL | CHANNEL NUMBER |
|---|---|---|
| 1 | 0 | INT 11 |
| 2 | 3 | INT 0 |
| 3 | 4 | INT 22 |
| . | . | . |
| . | . | . |
| 36 | 62 | INT 9 |
| 37 | 64 | INT 5 |
| 38 | 65 | INT 41 |
| . | . | . |
| . | . | . |
| 127 | 248 | INT 16 |
| 128 | 255 | INT 7 |

| ENTRY NUMBER | CHANNEL PRIORITY LEVEL | CHANNEL NUMBER |
|---|---|---|
| 1 | 0 | INT 11 |
| 2 | 3 | INT 0 |
| 3 | 4 | INT 22 |
| . | . | . |
| . | . | . |
| 36 | 62 | INT 9 |
| 37 | 65 | INT 41 |
| 38 | 69 | INT 19 |
| . | . | . |
| . | . | . |
| 127 | 250 | INT 5 |
| 128 | 255 | INT 7 |

| ENTRY NUMBER | CHANNEL PRIORITY LEVEL | CHANNEL NUMBER |
|---|---|---|
| 1 | 0 | INT11 |
| 2 | 3 | INT0 |
| 3 | 4 | INT22 |
| ... | ... | ... |
| 36 | 62 | INT9 |
| 37 | 64 | INT5 |
| 38 | 65 | INT41 |
| ... | ... | ... |
| 127 | 248 | INT16 |
| 128 | 255 | INT7 |

| ENTRY NUMBER | CHANNEL PRIORITY LEVEL | CHANNEL NUMBER |
|---|---|---|
| 1 | 0 | INT11 |
| 2 | 3 | INT0 |
| 3 | 4 | INT22 |
| ... | ... | ... |
| 36 | 62 | INT9 |
| 37 | 64 | INT5 |
| 38 | 64 | INT16 |
| ... | ... | ... |
| 127 | 250 | INT5 |
| 128 | 255 | INT7 |

| ENTRY NUMBER | CHANNEL PRIORITY LEVEL | CHANNEL NUMBER |
|---|---|---|
| 1 | 0 | INT11 |
| 2 | 3 | INT0 |
| 3 | 4 | INT22 |
| ... | ... | ... |
| 36 | 62 | INT9 |
| 37 | 64 | INT16 |
| 38 | 64 | INT5 |
| ... | ... | ... |
| 127 | 250 | INT5 |
| 128 | 255 | INT7 |

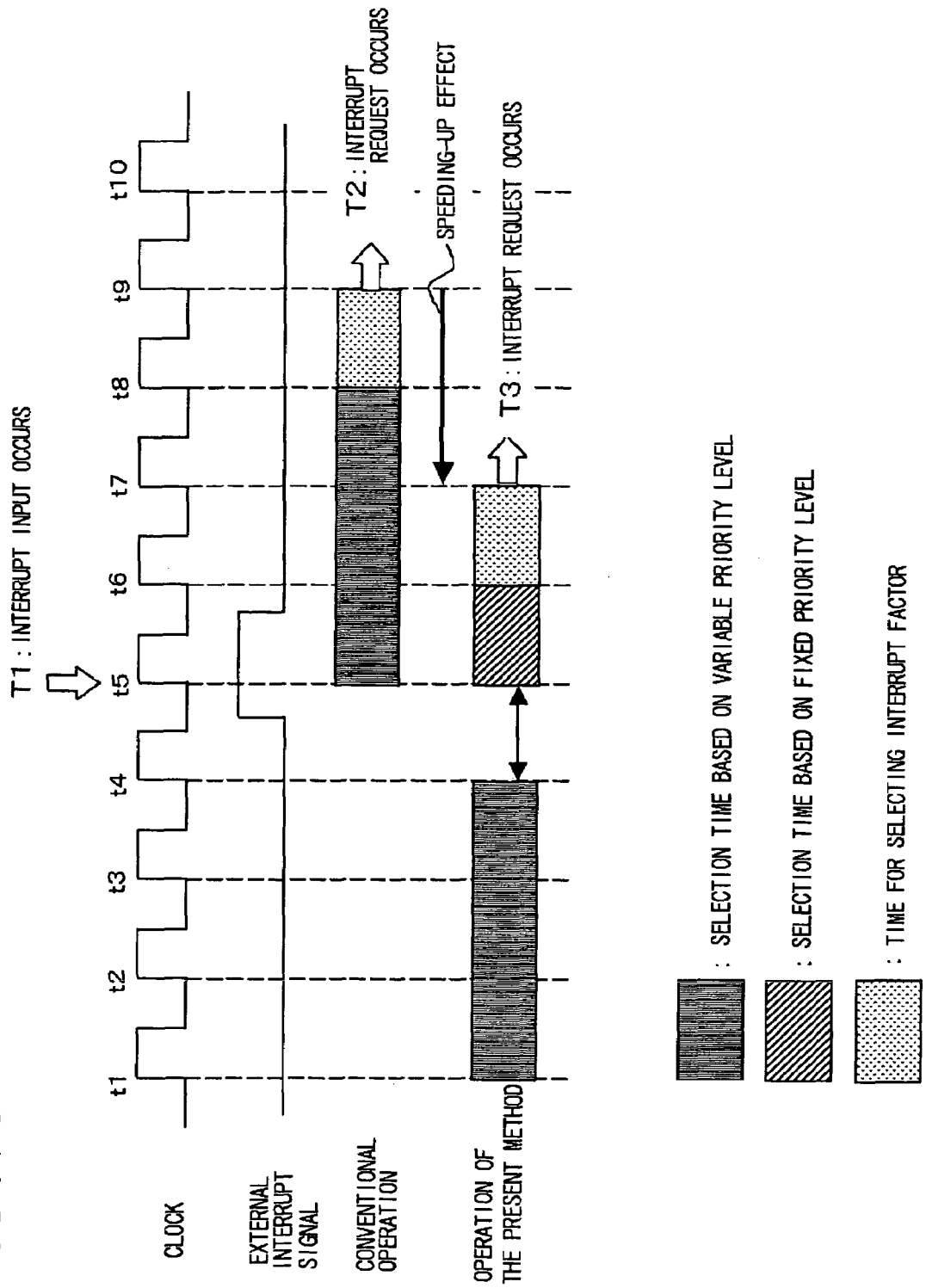

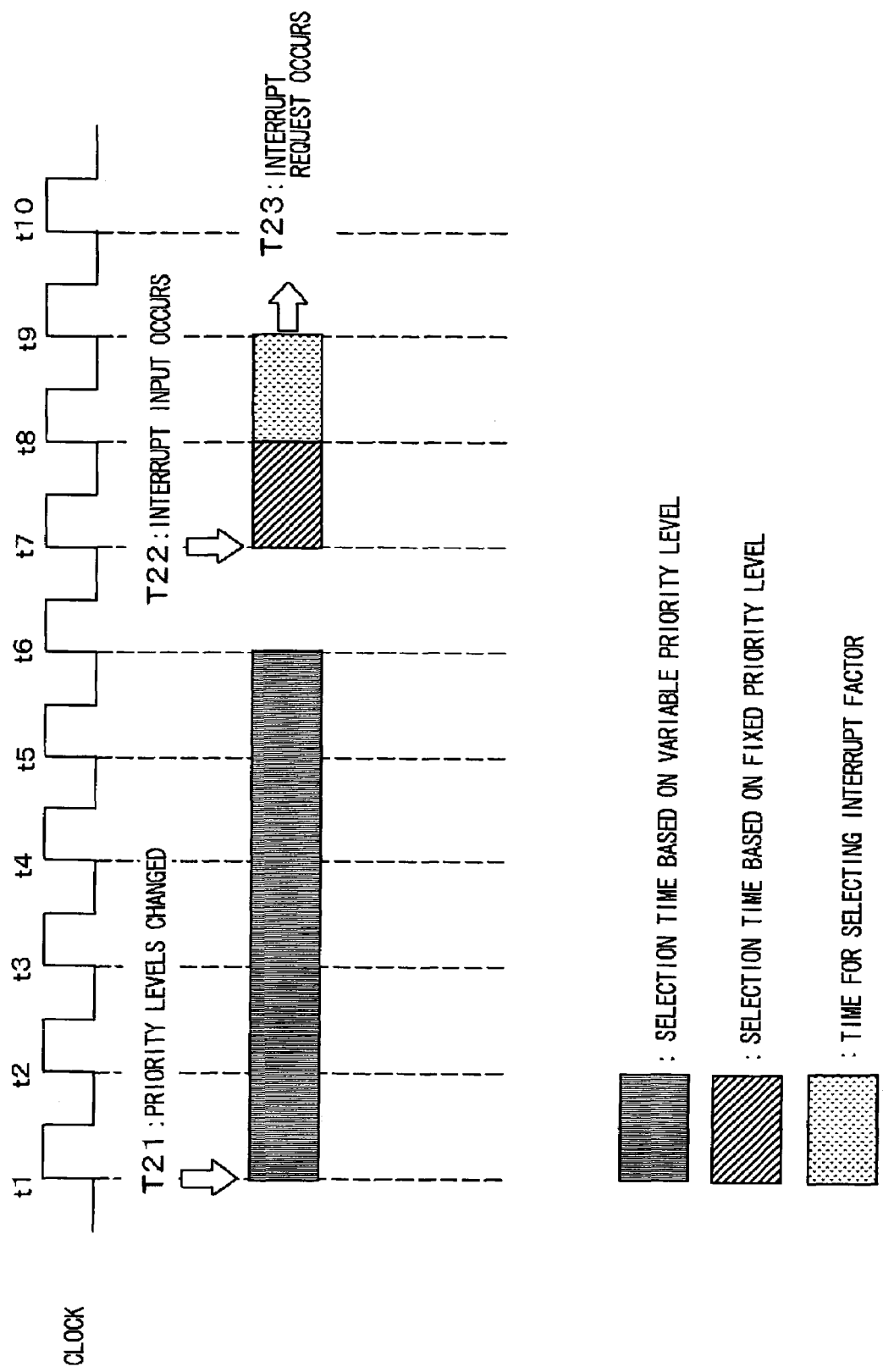

FIG. 12

| ENTRY NUMBER | CHANNEL NUMBER |
|---|---|
| 1 | INT11 |
| 2 | INT0 |
| 3 | INT22 |
| ... | ... |
| 36 | INT5 |
| ... | ... |
| 127 | INT16 |
| 128 | INT7 |

INTERRUPT CONTROLLER AND INTERRUPT CONTROL METHOD

FIELD OF THE INVENTION

The present invention relates to an interrupt controller and a method for controlling interrupts and particularly to an interrupt controller and a method for controlling interrupts in which the interrupt controller notifies the processor of an interrupt according to priority levels assigned to interrupt channels.

BACKGROUND OF THE INVENTION

The performance improvement of processors that process digital information has contributed to the recent development of digital technology. The performance of processors used in servers and PCs are evaluated based on the processing speed and the processing capability within a given time period. Meanwhile, one of the important performance indicators for embedded processors used in mobile information devices and digital home appliances is how well it processes interrupts. For instance, in order to add various functions to a mobile phone or electronically control a car, not only the processing performance of the processor core needs to be high, but also special-purpose circuits that perform particular processings are provided on-chip or off-chip around the processor core in addition to other peripheral circuits such as a timer. Normally, interrupt signals are used by these circuits to notify the processor core of completion or abnormality of processing. Since an increase in the number of peripheral circuits of the processor core means increase in the number of interrupts, an interrupt controller that manages interrupt requests from the peripheral circuits and that notifies appropriate requests to the processor core is provided between the processor core and the peripheral circuits. For embedded processors, the performance of this interrupt controller is also important.

One of the performance indicators for the interrupt controller is the number of interrupts that it can receive. The sources of interrupts, such as the aforementioned special-purpose circuits and multiprocessor cores in addition to DMACs (Direct Memory Access Controllers), timers, and serial interfaces, have increased and diversified. An efficient device is required to process a large number of interrupts generated by these sources of interrupts as the number of connected channels increases.

The interrupt controller notifies the occurrence of an interrupt to the processor core. There is a time lag from the moment when an interrupt occurs until the processor core starts processing in response to the interrupt, and a plurality of interrupts may occur during the time lag. Since the processor core can process only one interrupt at a time, when a plurality of interrupts occur, the interrupt controller selects an appropriate one from these multiple interrupt factors and notifies the processor core. As the determination reference for selecting an appropriate interrupt factor, an interrupt priority level is assigned to each interrupt factor. Two general types of priority level are as follows.

The first type is a fixed priority level determined at the time of designing the circuit. For the sake of management, a number is assigned to each input port receiving an interrupt from an external factor, and a circuit that selects interrupts in the ascending order of the port number (smaller numbers have higher priority levels) is provided in this first method. For example, when ports 3 and 7 receive interrupts simultaneously, the port 3, the smaller number, is always selected. Since the priority levels are determined when designing the circuit, the order in which the peripheral circuits are connected to the ports is important. Depending on the product in which the device is used, it is necessary to change the connection order, therefore this method lacks flexibility. On the other hand, it has an advantage that the selection circuit can be easily constituted since the circuit simply has to select in the ascending order of the port number even when a plurality of interrupts occur. The circuit delay of the selection circuit depends only on the number of interrupt factors connected. We will call this first type of priority level "fixed priority level."

The second type is a variable priority level that can be changed after the circuit has been designed. Memory means such as a register that holds a priority level value is provided for each input port. When one factor is selected from a plurality of interrupt factors, these priority level values are compared and a factor with the highest priority level is selected. The priority level values are set by software when the product is being used and can be changed as necessary. Therefore, this method has an advantage of being flexible since much consideration does not have to be given to the order in which the peripheral circuits are connected to the input ports and appropriate priority levels can be assigned to the peripheral circuits for each product to which the device is applied. On the other hand, it has a disadvantage that the selection circuit becomes very complex because it has to select a factor with the highest priority level from a large number of interrupt factors. The circuit delay of the selection circuit depends on the number of settable interrupt priority levels, in addition to the number of interrupt factors connected. We will call this second type of priority level "variable priority level." An example of interrupt processing using variable priority levels is disclosed in Japanese Patent Kokai Publication No. JP-A-11-149382 (hereinafter Patent Document 1).

Many interrupt controllers use both the types of priority levels. For instance, once interrupts are received, variable priority levels are compared first, and an interrupt factor is selected. Further, when the same priority level value is set to more than one port, an interrupt factor is selected according to fixed priority levels. In other words, the priority order is determined according to the two types of priority levels.

Next, the variable priority level disclosed in Patent Document 1 will be described, focusing only on the main part relating to the present invention. FIG. 13 is a drawing illustrating the configuration of an interrupt controller disclosed in Patent Document 1. The interrupt controller 100 is shown to have only one interrupt input port 200, however, it can support a large number of interrupt inputs by providing as many configurations shown in FIG. 13 as the number of interrupt factors necessary. When an interrupt is received through the port 200, the interrupt controller 100 outputs it from a port 201. The output from the port 201 is the logic OR of all interrupts received through the ports, and first, the processor core is notified that the interrupt has been received. The processor core that has received the interrupt request returns an acknowledgement to the interrupt controller 100 when it is ready to receive the interrupt and start interrupt processing. The interrupt controller 100 that has received the acknowledgement opens the output gate of an ABT-BUS transceiver 108, and outputs priority levels held in a register 106 to an ABT-BUS 204. The output of the ABT-BUS transceiver 108 is an open collector output that has a high impedance when the bit value of the register 106 is 1 and that is at low level when the bit value is 0. After a given time period such as one clock cycle has passed, an arbitration bit comparator 109 compares the value of the ABT-BUS 204 and the value of its priority level register 106 from the most significant bit to the least significant bit at a rate of one bit per clock cycle.

The ABT-BUS 204 is at a high impedance state when the value of the register is 1. When another interrupt controller connected to the ABT-BUS 204 is outputting 0, the comparison result is "nonidentical" since A is 1 and B is 0. When a smaller value of the priority level register has a higher priority, "nonidentical" means that an interrupt with a higher priority level than the one that the interrupt controller 100 has received exists. In this case, the bit comparison thereafter is suspended, and the output gate of the ABT-BUS transceiver 108 is closed. The arbitration bit comparator 109 continues to compare the priority levels of the other ports with its own as described above and when there are values confirmed to be identical from the most significant bit to the least significant bit, an arbitration control unit 110 determines that its request has the highest priority level and that it is qualified to notify the request to the processor core. Then, a gate 105 is opened and the value of an interrupt vector register 103 is outputted to a DATA terminal 203. The processor core receives the interrupt vector outputted to the DATA terminal 203, and moves on to interrupt processing.

SUMMARY OF THE DISCLOSURE

In the configuration in FIG. 13, arbitration can be performed only for variable priority levels. Since arbitration for fixed priority levels cannot be performed, the same priority level cannot be assigned to more than one port (this is not mentioned in Patent Document 1).

However, the more interrupt factors increase, the more difficult to assign a priority order (level) to each interrupt factor Further, the priority order that should be assigned to each interrupt factor varies, depending on the system in which the processor is used. Also, it is necessary to be able to reassign an appropriate priority order to each factor according to how the processor is being used even after the chip has been completed.

The increase in the number of interrupt factors and priority levels means that the time required to select one factor becomes longer. Even in the simple procedure of selecting from fixed priority levels, if the number of interrupt factors increases, the selection time will be longer accordingly. Further, even the increase in priority levels causes the circuit that compares priority levels to be larger, slowing down the processing, and more comparison circuits are required when the number of factors increases. As a result, it takes more time to obtain comparison results.

For instance, a port with the highest priority level is selected by comparing the bits in the priority register one after another in the conventional technology shown in FIG. 13. If the number of the priority levels is raised from 16 to 64, using the same method, the bit comparison will have to be performed six times as opposed to four times, and the circuit delay will also see an increase of two cycles, from four cycle to six cycles.

When it takes a long time to select a factor after receiving interrupts, the interrupt performance suffers and the operating frequency drops. In order to prevent this, a complex mechanism would have to be built into the circuit. However, if the solution to the performance degradation would be built into the circuit, it will be difficult to support increases in the number of factors and priority levels later.

In order to speed up the time between the reception of interrupts and the completion of the factor selection, the present inventor has come to a conclusion that a factor selection method independent of the number of interrupt factors and priority levels as much as possible should be realized by an algorithmic technique independent of built-in technology for circuits, and has invented the present invention.

According to a first aspect of the present invention, there is provided an interrupt controller that generates an interrupt request for a plurality of interrupt inputs according to priority levels. This interrupt controller comprises a queue circuit that holds channel numbers corresponding to interrupt inputs in the order of priority levels, and a queue control circuit that changes the order of channel numbers held in the queue circuit according to a new order of priority levels when a priority level that corresponds to any channel number is changed.

The queue control circuit may change the order of channel numbers held in the queue circuit may change according to interrupt priority level setting information from a processor.

It is preferred that whether or not channel numbers held in the queue circuit have an interrupt input request is investigated in the order of priority levels from the highest to the lowest in the queue circuit when an interrupt to be notified to a processor is selected from the plurality of interrupt inputs.

It is preferred that pairs of a channel number and a channel priority level indicating the priority level of the channel number are queued in the order of priority levels in the queue circuit, the priority level setting information is new channel priority level setting information for a specified channel number, and the queue circuit relocates the specified channel number so that the new channel priority level is queued in the order of priority levels.

It is preferred that when the new channel priority level is identical to an existing channel priority level, the queue control circuit relocates the specified channel number so that the identical channel priority levels are queued consecutively.

It is preferred that channel numbers are queued in the order of priority levels in the queue circuit, the priority level setting information is new priority level setting information for a specified channel number, and the queue control circuit relocates the specified channel so that the new priority level is queued in the order of priority levels.

According to a second aspect of the present invention, there is provided an interrupt control method in which a controller that generates an interrupt request for a plurality of interrupt inputs according to priority levels controls interrupts. This method includes holding channel numbers corresponding to interrupt inputs in the order of priority levels in a queue circuit, and changing the order of channel numbers held in the queue circuit according to a new order of priority levels when a priority level that corresponds to any channel number is changed.

The order of channel numbers held in the queue circuit may be changed according to interrupt priority level setting information from a processor.

It is preferred that whether or not channel numbers held in the queue circuit have an interrupt request is investigated in the order of priority levels from the highest to the lowest in the queue circuit when an interrupt to be notified to a processor is selected from the plurality of interrupt inputs.

It is preferred that pairs of a channel number and a channel priority level indicating the priority level of the channel number are queued in the order of priority levels in the queue circuit, the priority level setting information is new channel priority level setting information for a specified channel number, and the queue circuit relocates the specified channel number so that the new channel priority level is queued in the order of priority levels when the order of channel numbers held in the queue circuit is changed.

It is preferred that when the order of channel numbers held in the queue circuit is changed and the new channel priority level is identical to an existing channel priority level, the specified channel number is relocated so that the identical channel priority levels are queued consecutively.

It is preferred that channel numbers are queued in the order of priority levels in the queue circuit, the priority level setting information is new priority level setting information for a specified channel number, and the specified channel is relocated so that the new priority level is queued in the order of priority levels when the order of channel numbers held in the queue circuit is changed.

The meritorious effects of the present invention are summarized as follows.

According to the present invention, the time between the reception of interrupts and the completion of the factor selection can be shortened by changing the order of channel numbers held in a queue circuit according to a changed order of priority levels and by selecting a factor independently of the number of the priority levels.

BRIEF DESCRIPTIONS OF THE DRAWINGS

FIG. 2 is a drawing showing the data structure of a queue circuit relating to a first example of the present invention.

FIG. 8 is a first timing chart showing the timing of an interrupt.

FIG. 9 is a second timing chart showing the timing of an interrupt.

FIG. 12 is a drawing showing the data structure of a queue circuit relating to a second example of the present invention.

PREFERRED MODES OF THE INVENTION

An interrupt controller relating to a mode of the present invention generates an interrupt request for a plurality of interrupt inputs according to priority levels. Further, the interrupt controller (10 in FIG. 1) comprises a queue circuit (11 in FIG. 1) that holds channel numbers (factor numbers) corresponding to interrupt inputs in the order of the priority levels, and a queue control circuit (12 in FIG. 1) that changes the order of the channel numbers held in the queue circuit according to a new order of the priority levels when a priority level that corresponds to any channel number is changed.

The queue circuit holds the channel numbers in the order of the priority levels (from the highest to the lowest) so that it generates an interrupt request without depending on the number of the priority levels. The order of the channel numbers held in the queue circuit is changed by the queue control circuit according to a new order of the priority levels when the priority level of any channel number is changed, and this change operation is performed at the time of setting the priority levels, which is unrelated to the interrupt reception. When selecting an interrupt to be notified to a CPU (20 in FIG. 1), whether or not each channel number held in this queue circuit has an interrupt request is checked one after another from the head of the queue. In other words, whether or not each channel number has an interrupt request is checked from the highest priority level to the lowest one.

As described, since the controller does not have to deal with variable priority levels at the time of selecting an interrupt factor, the time required for selection does not depend on the number of the priority levels. Since it depends only on the number of factors, an increase in the delay time caused by the enhanced functionality of the interrupt controller can be suppressed. Further, an interrupt controller with excellent maintenance performance and expandability can be realized since a method using a simple queue circuit is employed in order to achieve this, instead of building specific circuits into the circuitry. The examples will be described in detail with reference to the drawings.

EXAMPLE 1

Figure 1:
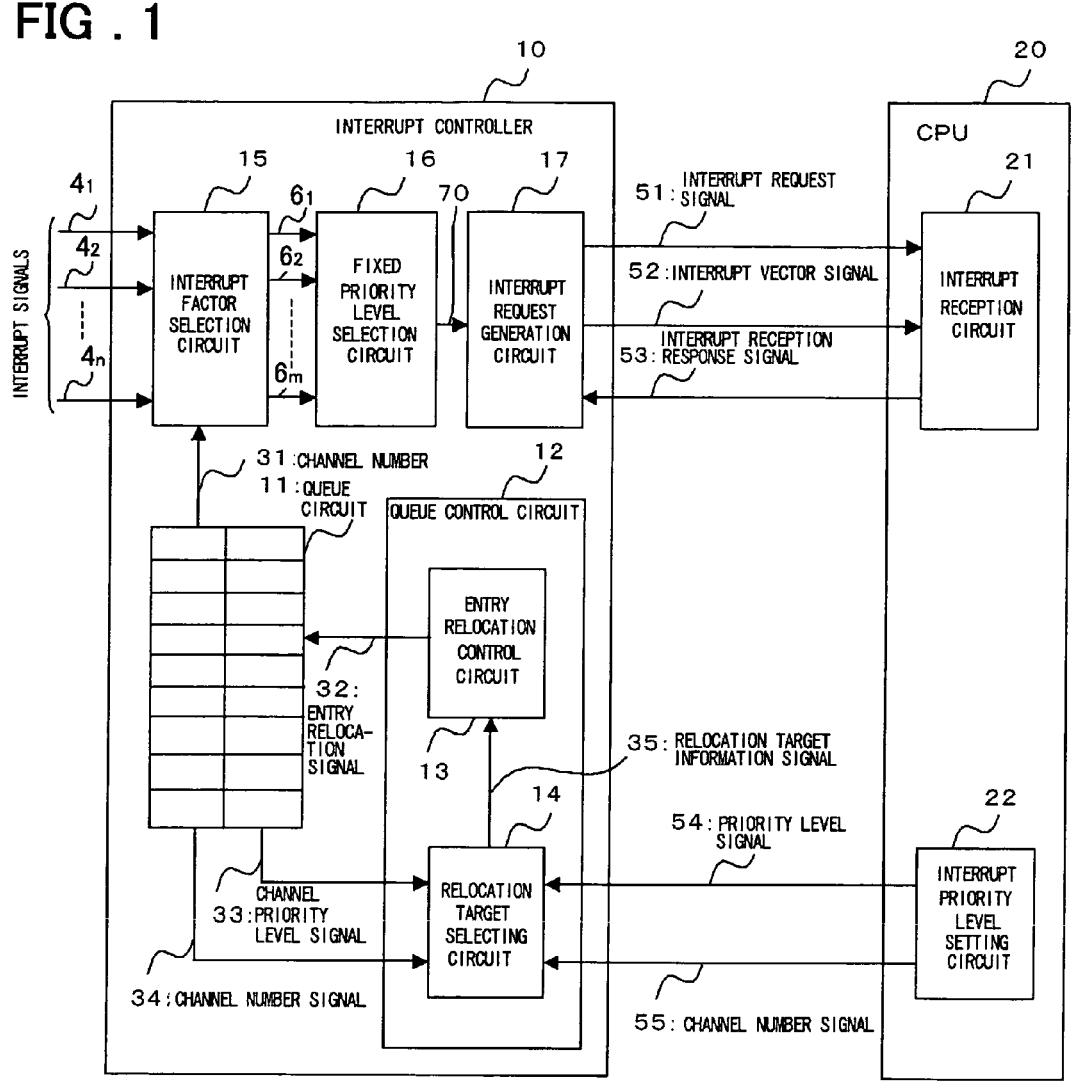
FIG. 1 is a block diagram illustrating the configuration of an interrupt controller relating an example of the present invention.

FIG. 1 is a block diagram illustrating the configuration of an interrupt controller relating an example of the present invention. The interrupt controller 10 receives interrupt signals $4_1, 4_2, \ldots 4_n$, and outputs an interrupt request signal 51 and an interrupt vector signal 52 to a CPU 20 according to priority levels corresponding to the interrupt signals. When an interrupt reception circuit 21 in the CPU 20 receives the interrupt request signal 51 and the interrupt vector signal 52, it returns an interrupt reception response signal 53 to the interrupt controller 10, and the CPU 20 executes interrupt processing according to the interrupt vector signal 52.

The interrupt controller 10 comprises a queue circuit 11, a queue control circuit 12, an interrupt factor selection circuit 15, a fixed priority level selection circuit 16, and an interrupt request generation circuit. Further, the queue control circuit 12 comprises an entry relocation control circuit 13 and a relocation target selecting circuit 14. The CPU 20 comprises an interrupt reception circuit 21 and an interrupt priority level setting circuit 22.

The queue circuit 11 holds the factor numbers (the channel numbers) of interrupt requests in the order of the priority levels. More concretely, a pair of a channel number and a channel priority level, which gives variable priority level information assigned to the channel, is provided for each of entry numbers 1 to 128 in the queue circuit 11 as shown in FIG. 2 (for instance a channel number INT11 and a channel priority level 0 for an entry number 1, a channel number INT0 and a channel priority level 3 for an entry number 2, etc.). Here, a channel means a set of circuit in the interrupt controller such as a port and a flag register that receives a interrupt request generated by each interrupt factor. The channel numbers from INT0 to a maximum number of interrupt inputs that the interrupt controller 10 comprises are assigned to the channels, and the interrupt controller 10 distinguishes each interrupt factor by the channel number assigned to a channel.

Further, as shown in FIG. 2, the channel numbers held in the queue circuit 11 are queued from the highest rank (i.e. in the descending order) of the variable priority levels assigned to the channels. In other words, when referring to the entries of the queue circuit 11 from the head entry 1, the channel numbers obtained are in the order of the priority levels, from the highest to the lowest.

The queue control circuit 12 changes the order of the channel numbers held in the queue circuit 11 when it receives a request from the CPU 20 that the priority levels of the channel numbers in the queue circuit 11 be changed. In this case, the interrupt priority level setting circuit 22 sends a priority level signal 54 and a channel number signal 55 that contain necessary information for changing the variable priority level of the channels. The relocation target selecting circuit 14 receives a channel number signal 34 indicating a channel number and a channel priority level signal 33 indicating the priority level of the channel from the queue circuit 11, and checks the current priority level held by each channel. Then it detects in what entry number the channel whose priority level is being changed should be newly relocated, and for what channel number the entry order is changed in the queue circuit 11. The entry relocation control circuit 13 receives a relocation target information signal 35, which contains information regarding the changing target based on the detection results by the relocation target selecting circuit 14, and outputs an entry relocation signal 32 to the queue circuit 11 so that the order in the queue circuit 11 is changed. The queue circuit 11 changes the order of the data according to the entry relocation signal 32. Note that the operation in which the order of the queue circuit 11 is relocated will be described in detail later.

The interrupt factor selection circuit 15 externally receives the interrupt signals $4_1$ to $4_n$, and receives a channel number 31 indicating the information of the priority levels queued in the order of interrupt priority from the queue circuit 11. Then it selects an interrupt from the interrupt signals $4_1, 4_2, \ldots 4_n$ according to the priority level order of the channels stored in the queue circuit 11.

Figure 3:
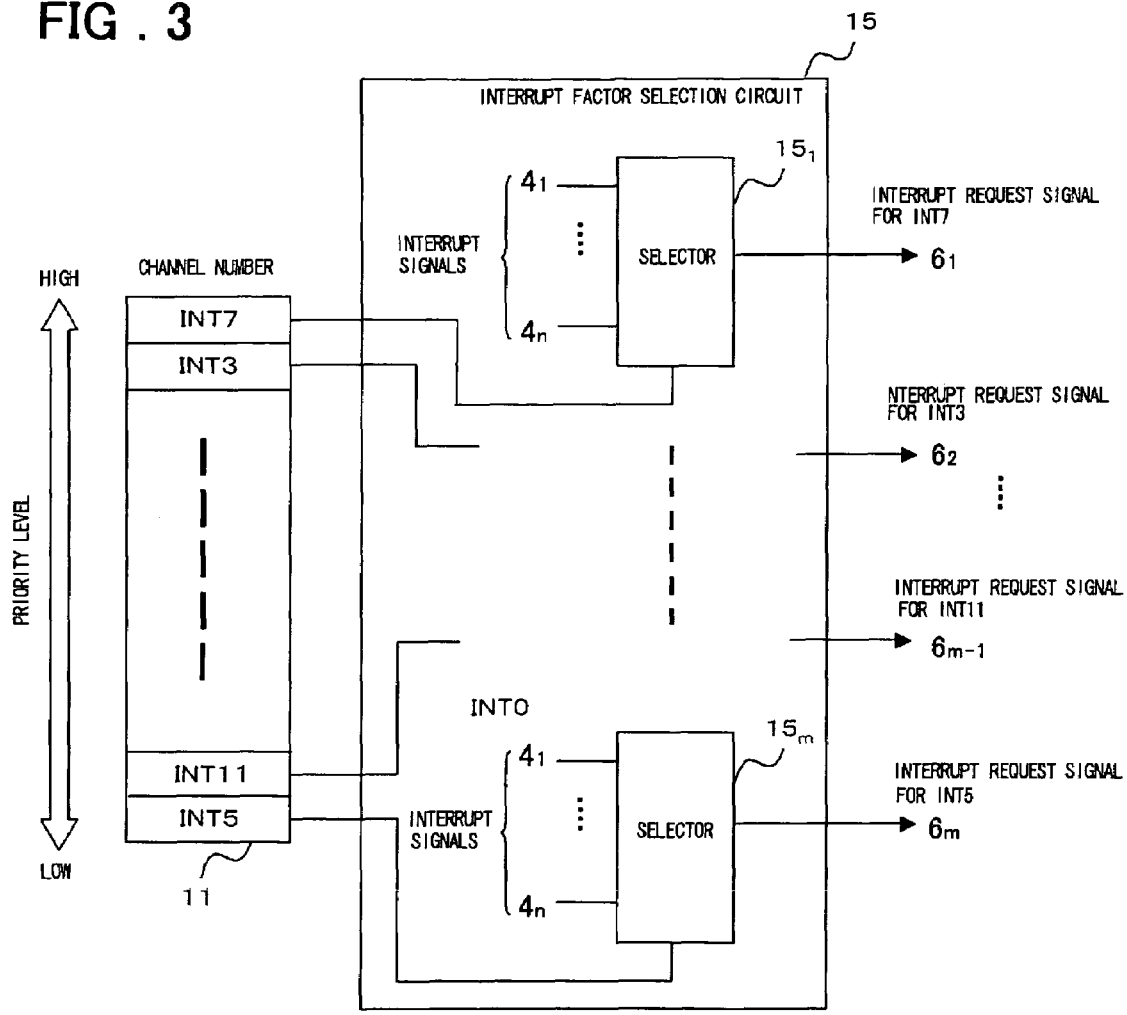
FIG. 3 is a block diagram illustrating the structure of an interrupt factor selection circuit relating to an example of the present invention.

FIG. 3 is a block diagram illustrating the structure of the interrupt factor selection circuit 15. The interrupt factor selection circuit 15 comprises selectors $15_1$, to $15_m$. The selectors $15_1$ to $15_m$ determine whether or not an interrupt corresponding to each channel stored in the queue circuit 11 exists in the interrupt signals $4_1$ to $4_n$, and activate a signal corresponding to the channel with an interrupt out of fixed channel signals $6_1$ to $6_m$. In other words, they check what channel number is assigned to each entry of the queue, and output an interrupt request corresponding to it. For instance, the selector $15_1$ activates and outputs a fixed channel signal $6_1$ when there is an interrupt corresponding to INT7 in the interrupt signals $4_1$ to $4_n$.

The fixed priority level selection circuit 16 receives the fixed channel signals $6_1$ to $6_m$, and outputs an interrupt notification signal 70 to an interrupt request generation circuit 17 according to the priority order of the fixed channel signals $6_1$ to $6_m$ when there is at least one active signal among the fixed channel signals $6_1$ to $6_m$.

Figure 4:
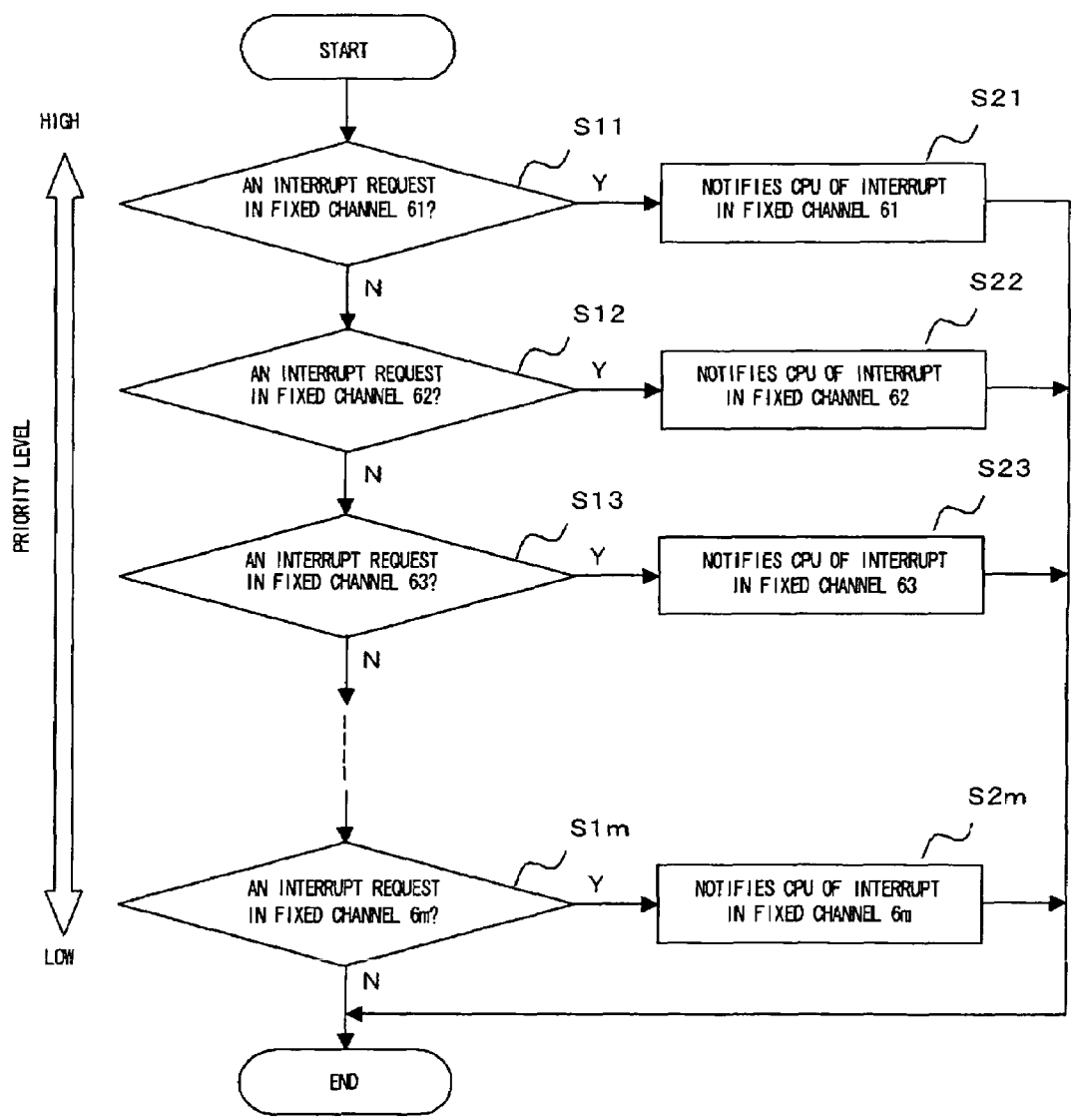
FIG. 4 is a flowchart showing the operation of a fixed priority level selection circuit relating to an example of the present invention.

FIG. 4 is a flowchart showing how an interrupt factor is selected according to the order of priority in the fixed priority level selection circuit 16. As mentioned above, the priority levels are given as the order of the channel numbers queued according to the priority levels. As shown in FIG. 4, in order to select an interrupt channel, whether or not there is an interrupt request in the channel of the head entry in the queue circuit 11 is checked first. In other words, whether or not there is an interrupt request in the fixed channel signal $6_1$ is checked in a step S11.

When there is an interrupt request in the channel of the head entry in the queue circuit 11, since this channel has the highest priority among channels with an interrupt request, the channel number, i.e., the interrupt factor connected to the channel, is notified to the CPU 20 via the interrupt request generation circuit 17, ending the channel selection (a step S21). When the channel in the head of the queue does not have an interrupt request or the interrupt request is masked (N in the step S11), whether or not the channel in the second entry of the queue has an interrupt request is checked, and the same processing as the one performed for the head entry is performed (a step S12). The channel in each entry is checked whether or not to have an interrupt request in the order of the queue as described, and when an interrupt request is found in any entry, the channel selection (queue search) stops.

By this queue search, a channel number in an entry closest to the head of the queue, i.e., a channel with the highest priority among channels with an interrupt request is selected and notified to the CPU 20. When there is no interrupt request corresponding to the channel number in the last entry, no interrupt factor is issuing an interrupt request, and the channel selection stops without notifying anything to the CPU 20 (N in a step S1m). The circuit that performs the steps of the flowchart shown in FIG. 4 corresponds to a fixed priority level circuit that selects an interrupt factor from the head of a queue and in the order of the queue.

The interrupt request generation circuit 17 receives the interrupt notification signal 70 from the fixed priority level selection circuit 16, and outputs the interrupt request signal 51 and the interrupt vector signal 52 to the interrupt reception circuit 21.

When the interrupt reception circuit 21 receives the interrupt request signal 51 and the interrupt vector signal 52, it returns the interrupt reception response signal 53 to the interrupt request generation circuit 17.

What is important in the interrupt processing described above is that the time required for a series of the interrupt request search (channel selection) operations depends only on the number of the channels (the number of the interrupt factors) and is unrelated to the priority levels. Therefore increasing the number of the priority levels does not affect the delay time of the circuit. Further, in the queue search, all the entries may be searched in one cycle if possible, as opposed to searching one entry per cycle. It is preferable that the queue circuit 11 be constituted by registers and not by RAM since it needs to access a plurality of entries simultaneously. This depends on the number of the channels as the interrupt factor selection circuit. The operation after the channel selection using the information from the queue is the fixed priority level selection.

The queue circuit 11 that holds the order of the interrupt selection plays the most important role in the present invention. This queue circuit will be described in detail. As mentioned above, each entry number in the queue circuit 11 has a pair of a channel number and a channel priority level corresponding to the channel, and the channel numbers are arranged in the order of the priority levels. The queue circuit 11 has the three following characteristics.

The first characteristic is that it is very easy to expand the priority levels. When doing so, the bit number of the priority level part of the queue and the bit number of the priority level comparison part in the relocation target selecting circuit 14 (described later) should simply be increased as necessary. Since the priority level information is used only when the entries are relocated, increasing the priority levels does not influence the time for generating an interrupt request.

The second characteristic is that the queue circuit 11 holds all the channel numbers, and the values of these channels are unique. The same channel number is not held by more than one entry, and there is no channel number not held in an entry of the queue circuit. In other words, the number of the entries and the number of the channels are the same in the queue circuit.

The third characteristic is that the number of the priority levels is not related to the number of the channels (the number of the entries in the queue circuit). For instance, in FIG. 2, the number of the channels is 128, but the number of the priority levels is 256. The difference between the priority levels of the channels held by the entries 127 and 128 is 7. Meanwhile, it is possible to have fewer priority levels than the channels. In this case, channels having the same priority level are located in more than one entry. Of course, it is possible to set the same priority level in a plurality of entries even when there are more priority levels than entries as in FIG. 2. In the conventional technology disclosed in Patent Document 1, the same priority level cannot be set to a plurality of the ports since it cannot control fixed priority levels. However, since fixed priority levels are realized as the entry order of the queue in the present invention, the same priority level can be set in a plurality of entries.

Next, how the contents of the entries are changed in the queue circuit 11 will be explained. When the priority level assigned to a channel is changed, the entry content in the queue circuit 11 is changed, and the order of the channels is changed according to the newly set priority levels. This change of setting is performed at a time unrelated to the generation of an interrupt request.

Figures 5A, 5B:
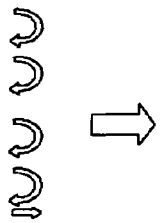
FIGS. 5A and 5B are drawings showing a first example of data relocation in the queue circuit.

Operation examples of the queue update in the queue circuit 11 are shown in FIGS. 5A to 7C. Here, the number of the entries (the number of the channels) is 128, the number of the priority levels is 256 (priority is high, if the number is small, i.e. the priority is determined in the descending order), and the contents of the queue are as shown in FIG. 5A. Let's assume that the CPU 20 makes a request to change the priority level of a channel number INT5 located in an entry 37 to 2 from a current channel priority level of 64. The CPU 20 issues a request to assign a priority level of 2 to the channel INT5. Based on this request, the relocation target selecting circuit 14 performs two searches about the contents of the queue.

First, the priority level in each entry number is searched, and in what entry number the newly set priority level should be placed is determined. Since the priority level of an entry number 1 is 0, and the priority level of an entry number 2 is 3 in the current state of the queue, the priority level of 2 should be placed in the entry number 2. Next, in what entry the channel number INT5 whose priority level is being changed is currently placed is investigated, and an entry number 37 is obtained as the answer. The relocation target selecting circuit 14 passes these pieces of information to the entry relocation control circuit 13. The entry relocation control circuit 13 compares the entry number to which the channel is newly relocated and the entry number in which the channel is currently located, and determines how the contents of the queue should be changed. When the new entry number and the current entry number are identical, the relocation operation of the queue is ended without changing anything.

As shown in FIG. 5A, when the new entry number is located closer to the head of the queue than the current entry, the entry contents are shifted to the lower priority level direction by one entry from the new entry to the one before the current entry as shown in FIG. 5B. Then the new entry is newly set.

Figures 6A, 6B:
FIGS. 6A and 6B are drawings showing a second example of data relocation in the queue circuit.

Meanwhile, when the priority level of the channel number INT5 is set to 250 from the state shown in FIG. 6A, i.e., the priority level of the channel number INT5 is lowered, an entry to which the newly set priority level is relocated is searched first as in FIG. 5A, and then the current entry of the channel number INT5 is searched. In FIG. 6A, the new entry number is 127, and the current entry number is 37. The entry relocation control circuit 13 receives these pieces of information and shifts the entry contents to the higher priority level direction by one entry from the new entry to the one after the current entry this time. The result is shown in FIG. 6B.

Figures 7A, 7B, 7C:
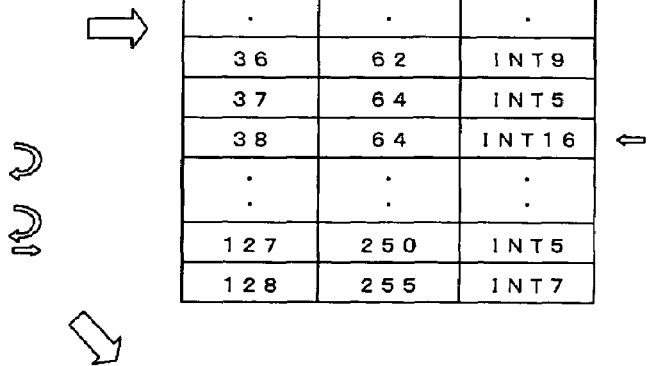
FIGS. 7A, 7B and 7C are drawings showing a third example of data relocation in the queue circuit.

As mentioned above, the same priority level can be set to a plurality of entries. In this case, a number of methods can be employed to relocate the entries. For instance, let's assume that the priority level of 64 is newly set to a channel number INT16 with a priority level 248 located in the entry number 127, and the channel INT5 located in the entry number 37 already has the same priority level 64 as shown in FIG. 7A.

In one method, the priority level is determined by the channel number. When the smaller channel number has priority, the channel number INT5 remains in the entry number 37, and the channel number INT16 is relocated to an entry number 38 (FIG. 7B). When the larger channel number has priority, the result is reversed (FIG. 7C).

In another method, the channel that already had the priority level has priority, or the channel to which the priority level is newly assigned has priority. When the channel that already had the priority level has priority, the channel number INT5 is in the entry number 37, and the channel number INT16 in the entry number 38 (FIG. 7B). When the channel set later has priority, the result is reversed (FIG. 7C).

In the entry relocating operation described above, it may take several cycles to search for the entry to which the new priority level is relocated and to search for the current entry. On the other hand, if it takes several cycles to shift the entry contents when the channel numbers are being relocated, an accurate priority level cannot be assigned to an interrupt request issued during that time. Therefore, the shift operation should be completed within one cycle.

The entry relocating operation in the queue circuit 11 described above is performed at a time unrelated to the generation of an interrupt request. Therefore, the selection time based on variable priority levels can be started at, for instance, a timing t1, sufficiently before a timing t5 when an interrupt input occurs (T1) as shown in FIG. 8. As a result, after the timing t5 of the interrupt input occurrence T1, an interrupt request occurrence T3 has to wait only until the selection time based on fixed priority levels and the time for selecting an interrupt factor have passed. On the other hand, an interrupt request occurrence T2 conventionally has to wait until the selection time based on variable priority levels and the time for selecting an interrupt factor have passed after the timing t5 of the interrupt input occurrence T1. Therefore, according to the present invention, the selection time based on variable priority levels (the judging time based on priority levels) can be taken out (freed) from the conventional method, and an interrupt request can occur much earlier.

Further, as shown in FIG. 9, it is possible to spend a long time (from the timing t1 to a timing t6) on the selection time based on variable priority levels, compared to the time required for generating an interrupt request (a timing t7 to a timing t9), which is from an interrupt input occurrence T22 to an interrupt request occurrence T23.

Figure 10:
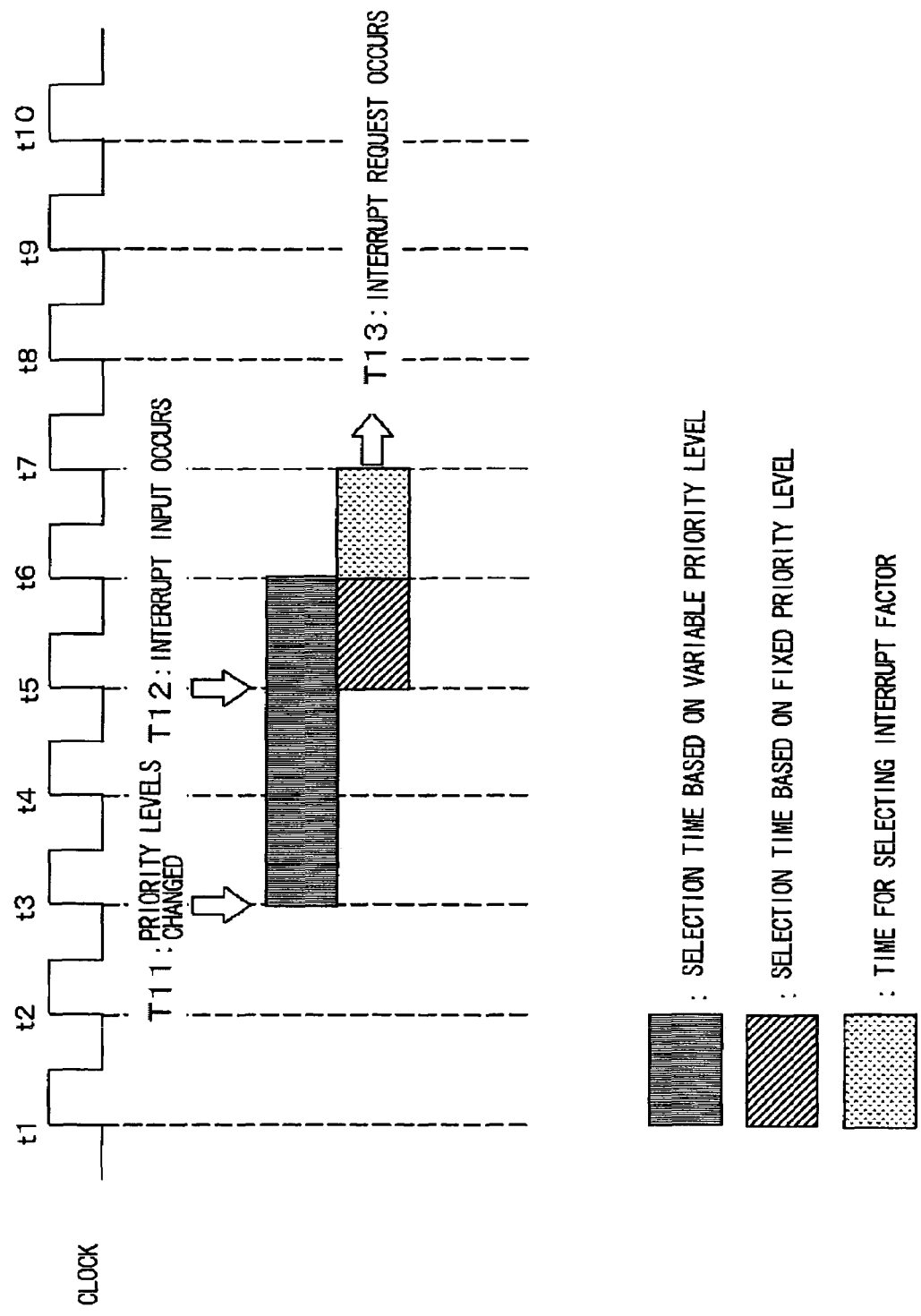
FIG. 10 is a third timing chart showing the timing of an interrupt.

When an interrupt input occurs (T12) while the contents of the queue are being changed (a priority level update T11) as indicated by the interrupt input occurrence T12 in FIG. 10, an interrupt request is generated according to the queue contents before the update.

Figure 11:
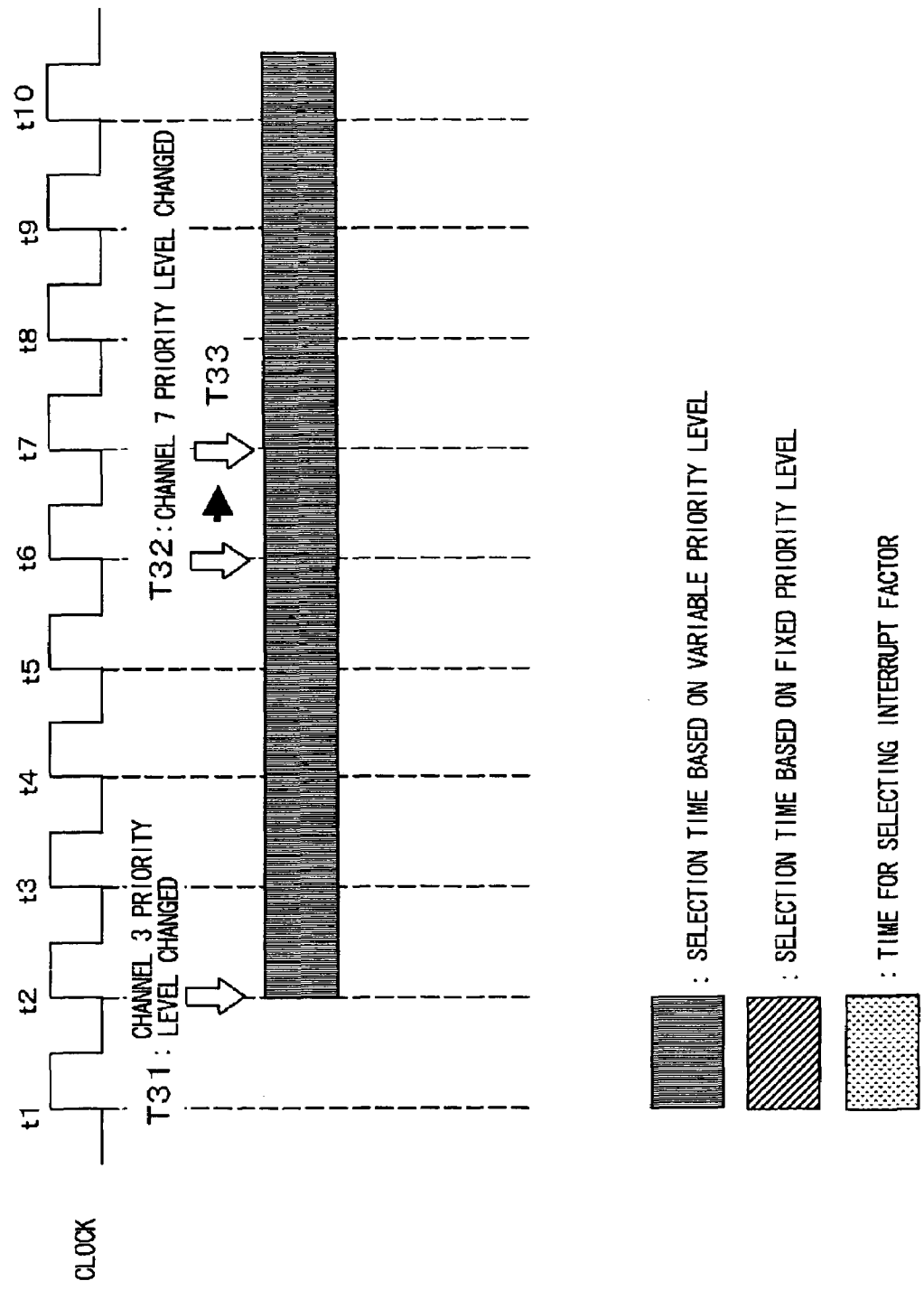
FIG. 11 is a timing chart when priority level updates overlap.
Figure 13:
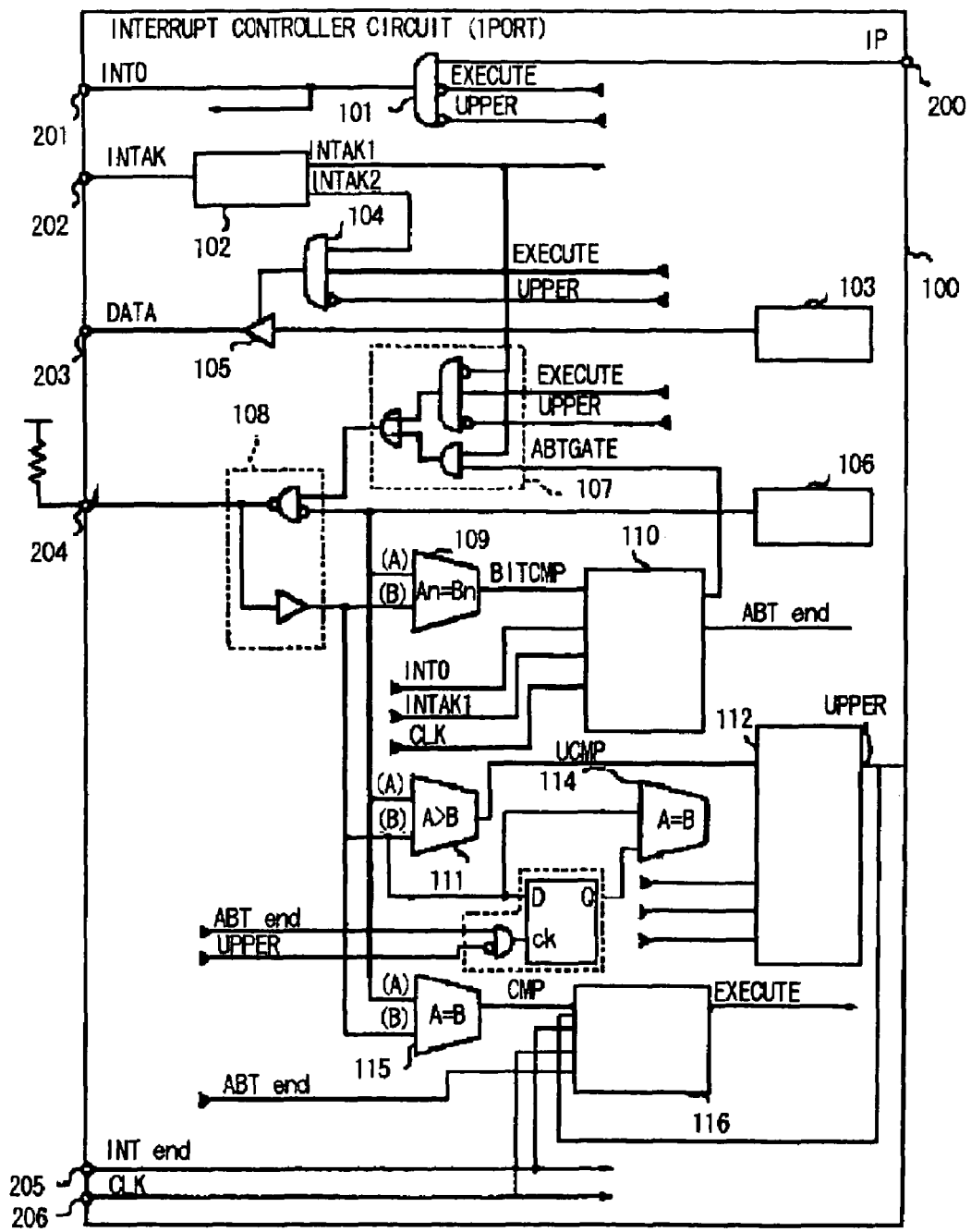
FIG. 13 is a block diagram illustrating the configuration of a conventional interrupt controller.

Further, for instance, when the CPU 20 issues a priority level update for a channel 7 (T32) while the queue is being updated by a priority level update T31 for a channel 3 as shown in FIG. 11, the request from the CPU 20 is delayed until, for instance, T33.

As described above, increasing the priority levels assigned to each channel does not influence the time for generating an interrupt request when the queue circuit 11 holding the order for selecting an interrupt is provided. Further, this can be achieved by a simply structured queue circuit without building corresponding circuits into the circuitry.

EXAMPLE 2

FIG. 12 is a drawing showing the data structure of a queue circuit relating to a second example of the present invention. In FIG. 12, the channel priority levels are omitted from the queue components shown in FIG. 2. It means that the variable priority levels assigned to each channel are represented by the entry numbers. In other words, when the number of the channels is 128, the number of the priority levels is also 128. A method in which an interrupt request is generated using this queue circuit is the same as the case of Example 1.

On the other hand, a method in which the channel priority levels are set is a little different. For instance, when a priority level 2 is set to a channel number INT5 in FIG. 12, i.e., the priority level of the channel INT5 is raised to an entry number 2, a channel number INT0 is already at the entry number 2. Assuming that priority is given to the latest setting, the channel INT5 is relocated to the entry number 2, and the channel number INT0 is shifted to an entry number 3. The contents below the entry number 3 are also shifted until the 36$^{th}$ entry in which the channel number INT5 used to be. These shifting operations are the same as the case of the queue circuit shown in FIG. 8. As a result of the shifting operations, the priority level of the channel number INT0 is changed from the value originally set, however, it cannot be helped since this queue does not have priority level information in the first place. Further, in FIG. 12, even when a priority level set by software is unchanged, the priority ranking within the queue will drop if another channel is relocated to a higher entry. Therefore, the structures in FIGS. 12 and 2 are similar in the sense that overall priority levels combining the priority levels set by software and the priority levels within the queue are changed from the ones set before.

An advantage of the queue structure shown in FIG. 12 is to be able to simplify the circuit and reduce the circuit area. First, the numerous registers that hold the priority level information in the queue circuit 11 can be reduced. Further, the circuit that searches and compares the priority levels becomes unnecessary, and the relocation target selecting circuit 14 can be simplified.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An interrupt controller generating an interrupt request for a plurality of interrupt inputs according to priority levels, comprising:
    a queue circuit that holds channel numbers corresponding to interrupt inputs in an order of priority levels; and
    a queue control circuit that changes an order of channel numbers held in said queue circuit according to a new order of priority levels when a priority level that corresponds to any channel number is changed.

2. The interrupt controller as defined in claim 1, wherein said queue control circuit changes the order of channel numbers held in said queue circuit according to interrupt priority level setting information from a processor.

3. The interrupt controller as defined in claim 2, wherein pairs of a channel number and a channel priority level indicating the priority level of the channel number are queued in the order of priority levels in said queue circuit, said priority level setting information is new channel priority level setting information for a specified channel number, and said queue circuit relocates said specified channel number so that said new channel priority level is queued in the order of priority levels.

4. The interrupt controller as defined in claim 3 wherein, when said new channel priority level is identical to an existing channel priority level, said queue control circuit relocates said specified channel number so that the identical channel priority levels are queued consecutively.

5. The interrupt controller as defined in claim 2, wherein channel numbers are queued in the order of priority levels in said queue circuit, said priority level setting information is new priority level setting information for a specified channel number, and said queue control circuit relocates said specified channel so that said new priority level is queued in the order of priority levels.

6. The interrupt controller as defined in claim 1, wherein whether or not channel numbers held in said queue circuit have an interrupt input request is investigated in the order of priority levels from the highest to the lowest in said queue circuit when an interrupt to be notified to a processor is selected from said plurality of interrupt inputs.

7. The interrupt controller as defined in claim 1, wherein the queue control circuit comprises:
    a relocation target selecting circuit configured to receive a channel number signal and to check a current priority level held by each channel; and
    an entry relocation control circuit to receive relocation target information based on the detection results from the relocation target selecting circuit and to output an entry relocation signal to the queue circuit.

8. The interrupt controller as defined in claim 7, wherein the queue circuit changes an order of the data according to the entry relocation signal.

9. An interrupt control method, in which a controller that generates an interrupt request for a plurality of interrupt inputs according to priority levels controls interrupts, the method comprising:
    holding channel numbers corresponding to interrupt inputs in an order of priority levels in a queue circuit; and
    changing an order of channel numbers held in said queue circuit according to a new order of priority levels when a priority level that corresponds to any channel number is changed.

10. The interrupt control method as defined in claim 9, wherein the order of channel numbers held in said queue circuit is changed according to interrupt priority level setting information from a processor.

11. The interrupt control method as defined in claim 10, wherein pairs of a channel number and a channel priority level indicating the priority level of the channel number are queued in the order of priority levels in said queue circuit, said priority level setting information is new channel priority level setting information for a specified channel number, and said queue circuit relocates said specified channel number so that said new channel priority level is queued in the order of priority levels when the order of channel numbers held in said queue circuit is changed.

12. The interrupt control method as defined in claim 11 wherein, when the order of channel numbers held in said queue circuit is changed and said new channel priority level is identical to an existing channel priority level, said specified channel number is relocated so that the identical channel priority levels are queued consecutively.

13. The interrupt control method as defined in claim 10, wherein channel numbers are queued in the order of priority levels in said queue circuit, said priority level setting information is new priority level setting information for a specified channel number, and said specified channel is relocated so that said new priority level is queued in the order of priority levels when the order of channel numbers held in said queue circuit is changed.

14. The interrupt control method as defined in claim 9, wherein whether or not channel numbers held in said queue circuit have an interrupt request is investigated in the order of priority levels from the highest to the lowest in said queue circuit when an interrupt to be notified to a processor is selected from said plurality of interrupt inputs.

15. A method of generating an interrupt request for a plurality of interrupt inputs according to priority levels, the method comprising:

inputting channel numbers corresponding to interrupt inputs in an order of priority levels into a queue; and changing an order of channel numbers held in said queue according to a new order of priority levels when a priority level that corresponds to any channel number is changed.

16. The method of claim 15, further comprising changing the order of channel numbers held in the queue according to interrupt priority level setting information.

17. The method of claim 15, further comprising investigating, when an interrupt is selected, whether channel numbers held in the queue have an interrupt input request in the order of priority levels from a highest to a lowest.

18. The method of claim 15, further comprising:
searching a priority level in each entry number; and
determining a newly set priority level.

19. The method of claim 15, further comprising:
investigating into which of an entry channel the channel number is changed;
comparing the channel number to which the changed entry channel is newly relocated and the previous channel number for the entry channel being relocated; and
shifting entry contents to a higher level in the queue when a new entry number is higher than an old entry number and shifting the entry contents to a lower level in the queue when the new entry number is lower than the old entry number.

20. The method of claim 15, further comprising searching for a channel number in an entry channel closest to a head of the queue.

\* \* \* \* \*